United States Patent
Terasaki

[11] Patent Number: 6,051,341
[45] Date of Patent: Apr. 18, 2000

[54] ORGANIC ELECTROLYTE BATTERY

[75] Inventor: Masanao Terasaki, Kyoto, Japan

[73] Assignee: Japan Storage Battery Co., Ltd., Kyoto, Japan

[21] Appl. No.: 08/998,658

[22] Filed: Dec. 29, 1997

[30] Foreign Application Priority Data

Dec. 28, 1996 [JP] Japan .................................. 8-358331

[51] Int. Cl.⁷ .................................................. H01M 4/66
[52] U.S. Cl. .......................... 429/234; 429/235; 429/245
[58] Field of Search .................................... 429/234, 235, 429/236, 237, 245

[56] References Cited

U.S. PATENT DOCUMENTS

| | | | |
|---|---|---|---|
| 4,346,153 | 8/1982 | Rigal et al. | 429/245 X |
| 4,603,165 | 7/1986 | McDonald et al. | 524/440 |
| 5,112,706 | 5/1992 | Pinsky et al. | 429/245 X |
| 5,248,510 | 9/1993 | Lim et al. | 429/236 |
| 5,478,676 | 12/1995 | Turi et al. | 429/234 |
| 5,573,554 | 11/1996 | Fauteux et al. | 429/245 X |

FOREIGN PATENT DOCUMENTS

| | | |
|---|---|---|
| 0 662 728 A1 | 12/1994 | European Pat. Off. . |
| 07249402 | 9/1995 | Japan . |
| 2 220 296 | 4/1990 | United Kingdom . |
| 95-21467 | 1/1995 | WIPO . |

*Primary Examiner*—Stephen Kalafut
*Attorney, Agent, or Firm*—Sughrue, Mion, Zinn, Macpeak & Seas, PLLC

[57] ABSTRACT

In an organic electrolyte battery, resistor layers having higher resisting values than those of electric conducting substrates retaining active material of an electrode are formed on the substrate surfaces.

9 Claims, 2 Drawing Sheets

ORGANIC ELECTROLYTE BATTERY

BACKGROUND OF THE INVENTION

1. Field of the Invention

The present invention relates to an organic electrolyte battery which can improve the safety under extremely severe conditions such as nailing and breakage of batteries.

2. Description of the Related Art

Realization of practical use of an electric vehicle and the storage of electrical energy of night generation have been required from the viewpoint of environmental problems, such as air pollution, the increase of a carbon dioxide, etc., as well as the effective use of energy. Accordingly, an excellent secondary battery having characteristics such as high efficiency, high power density, high energy density, light weight, etc., has been demanded. From these points of view, a secondary battery using an organic electrolyte solution which has an; energy density several time larger than conventional batteries using an aqueous electrolyte, has been expected to be put to practical use.

As a positive active material of an organic electrolyte secondary battery, various materials have been examined, e.g., a titanium disulfide, a lithium-cobalt oxide, a lithium-nickel oxide, a lithium-manganese oxide, a vanadium oxide, a molybdenum sulfide, a molybdenum oxide, etc., and these active materials are retained on foils, e.g., aluminum, tantalum, stainless steel, etc., which are used as a positive plate (Unexamined Japanese Patent Publication (kokai) Nos. Hei. 5-290854 and Hei. 4-121962).

Various materials have been heretofore investigated as a negative active material of an organic electrolyte secondary battery and a lithium-based negative plate has attracted public attention in view of expectations of high energy density. Lithium metals, lithium alloys and carbons, oxides and sulfides capable of occluding and releasing lithium ions have been examined, and these active materials are retained on foils, e.g., stainless steel (Unexamined Japanese Patent Publication No. Hei. 5-29021), brass, phosphor bronze, and aluminum bronze (Unexamined Japanese Patent Publication No. Hei. 5-36401), and copper (Japanese Patent Publication No. Hei. 7-192724), etc., which are used as a negative plate.

Organic electrolyte solutions now used comprise an aprotic organic solvent containing a metal salt as an electrolyte dissolved therein. For example, with respect to lithium salts, $LiClO_4$, $LiPF_6$, $LiBF_4$, $LiAsF_6$, $LiCF_3SO_3$, etc., are dissolved in propylene carbonate, ethylene carbonate, 1,2-dimethoxyethane, $\gamma$-butyrolactone, sulfone, sulfolan, dioxolan, 2-methyltetrahydrofuran, dimethyl carbonate, diethyl carbonate, etc.

One example of a cylindrical organic electrolyte secondary battery is shown in FIG. 1. In FIG. 1, reference numeral 1 represents a case serving also as a negative plate terminal; 2, a positive electrode; 3, a negative electrode; 4, a separator; 5, a positive lead; 7, a positive terminal; 8, a safety valve; 9, a PTC element; 10, a gasket; and 11, an insulating plate. The positive electrode 2, the separator 4 and the negative electrode 3 are rolled up and housed in the case 1. The electrolyte solution is not shown in FIG. 1. FIG. 1 shows a cylindrical lithium secondary battery but a prismatic battery has substantially the analogous constitution.

Organic electrolyte batteries have high energy density and many of organic electrolyte solutions used therein are combustible. If a large current flows due to a short circuit or an erroneous use of a battery, abnormal heat is generated and there are possibilities of firing and battery bursting.

For preventing such phenomena, a fuse and a PTC element have been used in an electric circuit to break the flowing of a large current or a safety valve has been used to release the internal pressure of a battery container. Further, against an abnormally large current in a battery such as short circuits and nail penetration tests, a special separator having the function of operating at a specific temperature to reduce the discharge current of a battery, which is called a shutdown function, has been used.

Nail penetration tests are test methods prescribed in "safety evaluation standard guideline of lithium secondary batteries (SBAG1101)", and in "the guideline for safety evaluation of lithium batteries for cameras", Battery Association of Japan. The tests are supposing the severest internal short circuits due to the breakage of batteries.

FIG. 2 is a schematic view showing a nail penetration test. A metal bar having an acute tip (e.g., a nail) is stuck through an organic electrolyte secondary battery 20 held horizontally using a hydraulic driving means or a motor-driving means, and the safety of the battery is evaluated by the degrees of the generation of heat and the internal pressure increase of the battery resulting from the internal short circuit.

FIG. 3 is a schematic view showing the state of the internal short circuit caused by the nail penetration test. By the penetration of a nail 21 through a positive electrode 2, a negative electrode 3 and a separator 4, a positive substrate 2a having a positive active material 2b on both sides thereof and a negative substrate 3a having a negative active material 3b on both sides thereof are electrically connected via a nail 21 to thereby result in the state of a short circuit. Small-sized organic electrolyte secondary batteries now on the market are constructed such that safety can be ensured even under such a condition.

However, as to large-sized organic electrolyte secondary batteries, in particular, for use in electric vehicles, if an internal short circuit happens, an abnormally large current flows locally which cannot bear comparison with small-sized batteries, therefore, an organic electrolyte battery having a higher reliable safety structure than those heretofore in use has been demanded.

SUMMARY OF THE INVENTION

It is an object of the present invention to provide an organic electrolyte battery having a higher reliable safety structure than conventional batteries.

An organic electrolyte battery according to the present invention comprises: negative and positive plates each having an active material and an electrically conductive substrate, said active material being retained in said electrically conductive substrate; and a resistor layer having a higher resistance value than that of said electrically conductive substrate, said resistor layer being formed on a surface of said electrically conductive substrate of at least one of said negative and positive plates.

The present invention can provide an extremely reliable high safety organic electrolyte battery even under severe conditions, e.g., a nail penetration test as the resistance between the current collector surface and the nail is increased and a large current at a short circuit can be prevented from being discharged.

DETAILED DESCRIPTION OF THE INVENTION

Detailed description of the present invention will be described as follows.

A separator having a shutdown function is melted and destroyed and loses the shutdown function when exposed to high temperature. In the case of an organic electrolyte battery having capacity, if the battery is damaged or a nail penetration test is conducted, electrically conductive substrates of a positive plate and a negative plate are contacted with each other and results in an internal short circuit. As a result, an abnormally large current flows locally, sparks are generated, and the temperature increases unusually, a short circuit current cannot be reduced completely with only a separator having a shutdown function.

On the contrary, when an organic electrolyte battery adopting an electrically conductive substrate on the surface of which resistor layers having a higher resisting value than that of the electrically conductive substrate are formed, even if an internal short circuit, etc., happens, the resistor layers on the surface of the electrically conductive substrate function as a resistant and can prevent a large current flow. Accordingly, the safety of an organic electrolyte battery having large capacity can be remarkably improved.

Although the provision of resistor layers on the surface of an electrically conductive substrate functions to increase the internal resistance of a battery, the resisting value changes in inverse proportion to the area of a connecting part, which hardly hinders current collecting from an active material. The connecting area by a nail penetration test and the local breakage of a separator is small, while the resisting value is very large. However, as a current collecting area (a so-called active area) of the electrically conductive substrate and the active material is extremely large, the increase of the internal resistance of the battery is little.

EXAMPLE

Figure 1:
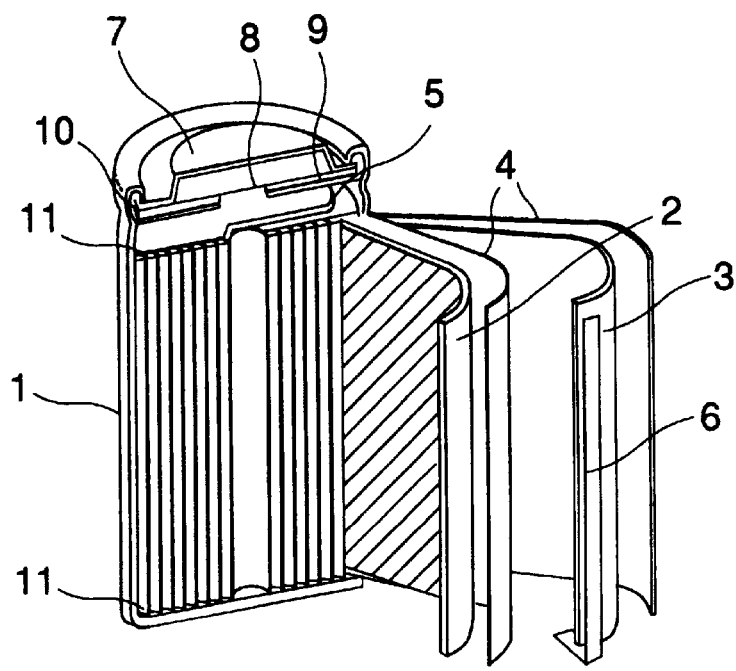
FIG. 1 shows the structure of a cylindrical organic electrolyte battery.
Figure 2:
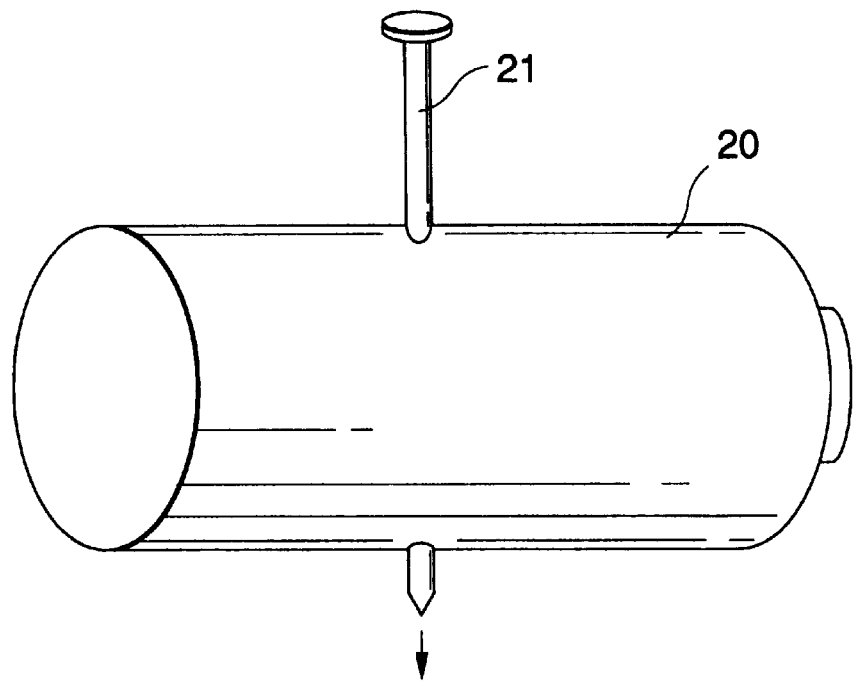
FIG. 2 is a schematic view showing a nail penetration test.
Figure 3:
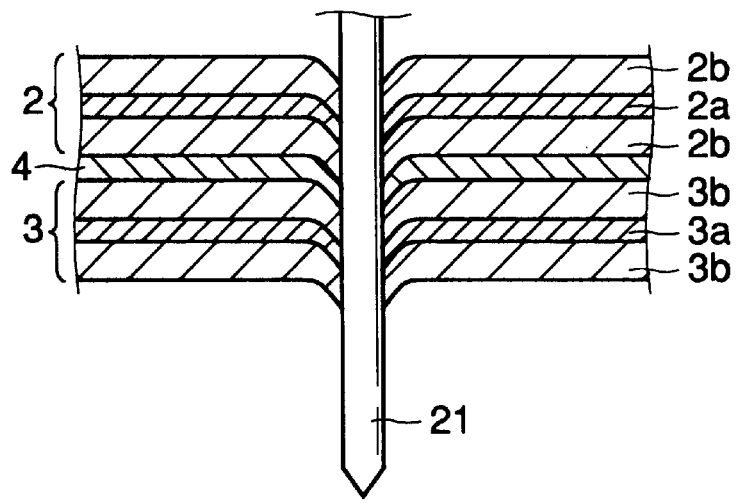
FIG. 3 is a schematic view showing the state of the internal short circuit caused by the nail penetration test.

A cylindrical organic electrolyte battery shown in FIG. 1 was produced by using a lithium-cobalt oxide as positive material, carbon which had been occluded a lithium ion in a negative electrode, and $LiPF_6$ dissolved in a mixed solvent of ethylene carbonate/propylene carbonate in proportion of 1/1 as an organic electrolyte solution. As a safety valve, a metal foil having a diameter of 15 mm was used, and when the internal pressure of the battery abnormally increased, the internal pressure was released to the outside. The battery had a diameter of 52 mm, a height of 200 mm and a weight of 900 g. The average voltage of this battery was 3.6 V and nominal capacity was 30 Ah. Various batteries were constructed by modifying this fundamental structure of the battery using various positive and negative plate substrates and nail penetration test was conducted.

Example 1

Aluminum having a thickness of 0.02 mm and having provided on both sides thereof resistor layers was used as a positive plate substrate. Resistor layers were formed by coating a mixture of a carbon powder and a polyimide resin on the above substrate. Resisting values of resistor layers were set to be 0.1, 1.0, 10.0, 20.0, 100 $\Omega \cdot cm^2$, respectively (products of the invention). The thickness of resistor layers was varied between 0.001 and 0.01 mm. For comparison, a positive plate substrate not having resistor layers on the surface of the substrate was also prepared (a conventional product). Copper having a thickness of 0.02 mm was used as a negative plate substrate. The resisting value of the aluminum substrate used was $5.5 \times 10^{-9}$ $\Omega \cdot cm^2$ and that of the copper substrate was $3.5 \times 10^{-9}$ $\Omega \cdot cm^2$.

These organic electrolyte batteries were completely charged and subjected to a nail penetration test at room temperature. After 30 seconds from the nailing, the electrolyte solution of the conventional product jetted from the safety valve and the battery surface temperature rose up to 370' C. On the other hand, the batteries according to the present invention each having resistor layers on the substrate surface were on such levels as temperatures increased to 115' C. at the maximum in 7 to 12 minutes from the nailing, and a working of the safety valve was not observed at all.

Example 2

Copper having a thickness of 0.02 mm and having resistor layers provided on both sides was used as a negative plate substrate. Resistor layers were formed by coating a mixture of a carbon powder and a polyimide resin on the above substrate. Resisting values of resistor layers were set to be 0.1, 1.0, 10.0, 20.0, 100 $\Omega \cdot cm^2$, respectively (products of the invention). The thickness of resistor layers at this time was varied between 0.001 and 0.01 mm. For comparison, a negative plate substrate not having resistor layers on the surface of the substrate was also prepared (a conventional product). Aluminum having a thickness of 0.02 mm was used as a positive plate substrate. The resisting value of the aluminum substrate used was $5.5 \times 10^{-9}$ $\Omega \cdot cm^2$ and that of the copper substrate was $3.5 \times 10^{-9}$ $\Omega \cdot cm^2$.

These organic electrolyte batteries were completely charged and subjected to a nail penetration test at room temperature. After 29 seconds from the nailing, the electrolyte of the conventional product jetted from the safety valve and the battery temperature rose up to 380' C. On the other hand, the batteries of the present invention each having resistor layers on the substrate surface were on such levels as temperatures increased to 116' C. at the maximum in 6 to 12 minutes from the nailing, and a jet of the electrolyte solution was not observed at all.

Example 3

Organic electrolyte batteries were produced by using positive plate substrates each having resistor layers on both surfaces thereof prepared in Example 1 and negative plate substrates each having resistor layers on both surfaces thereof prepared in Example 2, and they were similarly subjected to a nail penetration test. These batteries were on such levels as temperatures increased to 118' C. at the maximum in 10 to 17 minutes from the nailing, and a jet of the electrolyte solution was not observed at all.

Figure 4:
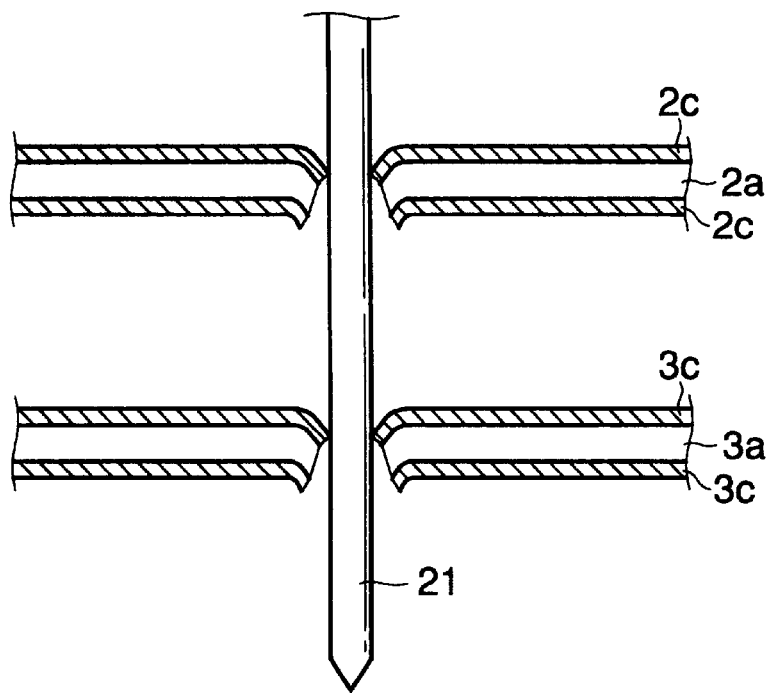
FIG. 4 is an enlarged view showing the short circuit state.

As described above, the present invention can provide extremely reliable high safety organic electrolyte battery even under a severe condition, e.g., a nail penetration test. This is presumably because, as shown in the enlarged drawing showing a short circuit state in FIG. 4, resistance of the connected part with a nail 21 was increased by resistor layers 2c on the surface of a positive plate substrate 2 or/and resistor layers 3c on the surface of a negative plate substrate 3a, therefore, a large quantity of electric current at a short circuit was prevented from being discharged.

In the above description, resistor layers on the substrate surfaces were formed by coating a mixture of a carbon powder and a polyimide resin but resistor layers are not limited thereto, e.g., anticorrosion resins such as polyamideimide, polyolefin, CMC and PVDF against electrolyte solutions and active materials are usable, alternatively metal powders such as Fe, Cu, Ni and Stainless powder can be used in place of carbon powders or mixtures of carbon powders and metal powders can also be used. Further, the structure of a resistor layer may be a bi-metal structure of a high resistive alloy such as stainless and nichrome with a current collecting metal (high resistive alloy/electrically conductive substrate metal/high resistive alloy).

With respect to the thickness of a resistor layer, an preferable value is selected in accordance with the producing technique. Too thin a layer causes peeling-off or cracking when an electrode plate is wound vertically, and too thick a layer causes the reduction of energy density due to the increased electrode plate thickness. The thicknesses of both a positive plate and a negative plate of from 0.001 to 0.2 mm are practicable but, from the results in the nail penetration test, from 0.001 to 0.05 mm are more preferable.

The resisting values of resistor layers of from 0.1 to 100 $\Omega \cdot cm^2$ were practicable. If the resisting value of a resistor layer is too big, high efficient discharge required in general use is reduced. As is depending on the use of a battery, in electric vehicles where high efficient discharge is required, 20 $\Omega \cdot cm^2$ or less is suitable.

The resisting values of resistor layers in the present invention are values per a unit area. In general, a resisting value of a material is indicated as a specific resistance. The thickness of resistors having low specific resistance may be thick and the thickness of those having high specific resistance must be thin. The thickness of resistors are arbitrarily variable in the range of from 0.001 to 0.2 mm.

The specific resistance of a resistor which can be used in the present invention can be selected from the wide range of from 20 $\Omega cm$ to 1 M $\Omega cm$.

What is claimed is:

1. An organic electrolyte battery comprising:

negative and positive plates each having an active material and an electrically conductive substrate, said active material being retained in said electrically conductive substrate; and a resistor layer having a resisting value in the range of 0.1 to 100 $\Omega \cdot cm^2$, which is higher than the resisting value of said electrically conductive substrate, said resistor layer being formed on a surface of said electrically conductive substrate of at least one of said negative and positive plates.

2. An organic electrolyte battery according to claim 1, wherein a thickness of said resistor layer is in the range of 0.001 to 0.2 mm.

3. An organic electrolyte battery according to claim 1, wherein said resistor layer comprises a carbon powder and a resin.

4. An organic electrolyte battery according to claim 1, wherein said resistor layer comprises a metal powder and a resin.

5. An organic electrolyte battery according to claim 1, wherein said resistor layer comprises a conductive resin.

6. An organic electrolyte battery according to claim 4, wherein said resistor layer further comprises a metal powder.

7. An organic electrolyte battery according to claim 1, wherein the specific resistance of the resistor layer is from 20 $\Omega cm$ to 1 M $\Omega cm$.

8. An organic electrolyte battery according to claim 1, wherein the resisting value of the resistor layer is in the range of 0.1 to 20 $\Omega \cdot cm^2$.

9. An organic electrolyte battery according to claim 2, wherein the thickness of the resistor layer is in the range of 0.001 to 0.05 mm.

* * * * *